| (12) | United States Patent | (10) Patent No.: | US 9,972,858 B2 |
|---|---|---|---|
| | Dong et al. | (45) Date of Patent: | May 15, 2018 |

(54) REDOX FLOW BATTERY

(71) Applicant: Sumitomo Electric Industries, Ltd., Osaka-shi (JP)

(72) Inventors: Yongrong Dong, Osaka (JP); Hirokazu Kaku, Osaka (JP); Kei Hanafusa, Osaka (JP); Ryojun Sekine, Osaka (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 153 days.

(21) Appl. No.: 14/773,112

(22) PCT Filed: Aug. 4, 2014

(86) PCT No.: PCT/JP2014/070422
§ 371 (c)(1),
(2) Date: Sep. 4, 2015

(87) PCT Pub. No.: WO2015/019972
PCT Pub. Date: Feb. 12, 2015

(65) Prior Publication Data
US 2016/0013506 A1    Jan. 14, 2016

(30) Foreign Application Priority Data
Aug. 7, 2013   (JP) .................................. 2013-164541

(51) Int. Cl.
*H01M 8/20* (2006.01)
*H01M 8/18* (2006.01)

(52) U.S. Cl.
CPC ............ *H01M 8/188* (2013.01); *H01M 8/20* (2013.01); *H01M 2300/0011* (2013.01); *Y02E 60/528* (2013.01)

(58) Field of Classification Search
CPC .................................................... H01M 8/188
See application file for complete search history.

(56) References Cited

U.S. PATENT DOCUMENTS 6,143,443 A * 11/2000 Kazacos .............. H01M 8/188
429/188
8,771,857 B2 * 7/2014 Shigematsu .......... H01M 8/188
429/105
(Continued)

FOREIGN PATENT DOCUMENTS

EP    3 032 629 A1   6/2016
JP    57-009073 A    1/1982
(Continued)

OTHER PUBLICATIONS

Extended European Search Report in counterpart European Patent Application No. 14833636.5 dated Dec. 7, 2016.
(Continued)

*Primary Examiner* — Jeremiah R Smith
(74) *Attorney, Agent, or Firm* — Venable LLP; Michael A. Sartori; Kerri M. Patterson

(57) ABSTRACT

Provided is a redox flow battery that can suppress generation of a precipitation on a positive electrode. The redox flow battery performs charging and discharging by supplying a positive electrode electrolyte and a negative electrode electrolyte to a battery cell that includes a positive electrode, a negative electrode, and a separating membrane interposed between the two electrodes. The positive electrode electrolyte contains a manganese ion and an additional metal ion, the negative electrode electrolyte contains at least one metal ion selected from a titanium ion, a vanadium ion, a chromium ion, and a zinc ion, and the additional metal ion contained in the positive electrode electrolyte is at least one of an aluminum ion, a cadmium ion, an indium ion, a tin ion, an antimony ion, an iridium ion, a gold ion, a lead ion, a bismuth ion, and a magnesium ion.

10 Claims, 1 Drawing Sheet

(56) References Cited

U.S. PATENT DOCUMENTS

| | | | | |
|---|---|---|---|---|
| 9,812,883 | B2* | 11/2017 | Brushett | H02J 7/0052 |
| 2010/0003545 | A1* | 1/2010 | Horne | B60L 11/1824 |
| | | | | 429/471 |
| 2011/0070483 | A1* | 3/2011 | Keshavarz | H01M 8/188 |
| | | | | 429/188 |
| 2012/0045680 | A1* | 2/2012 | Dong | H01M 8/04186 |
| | | | | 429/109 |
| 2014/0030572 | A1* | 1/2014 | Esswein | H01M 10/4242 |
| | | | | 429/107 |
| 2014/0134465 | A1 | 5/2014 | Kumamoto et al. | |
| 2014/0363753 | A1* | 12/2014 | Kumamoto | H01M 8/188 |
| | | | | 429/447 |

FOREIGN PATENT DOCUMENTS

| | | |
|---|---|---|
| JP | 4835792 B2 | 12/2011 |
| JP | 2012-079678 A | 4/2012 |
| TW | 201131877 A | 9/2011 |
| WO | 2011/111717 A1 | 9/2011 |
| WO | WO-2011/111254 A1 | 9/2011 |
| WO | 2013/002137 A1 | 1/2013 |

OTHER PUBLICATIONS

International Search Report in PCT International Application No. PCT/JP2014/070422 dated Nov. 4, 2014.

* cited by examiner

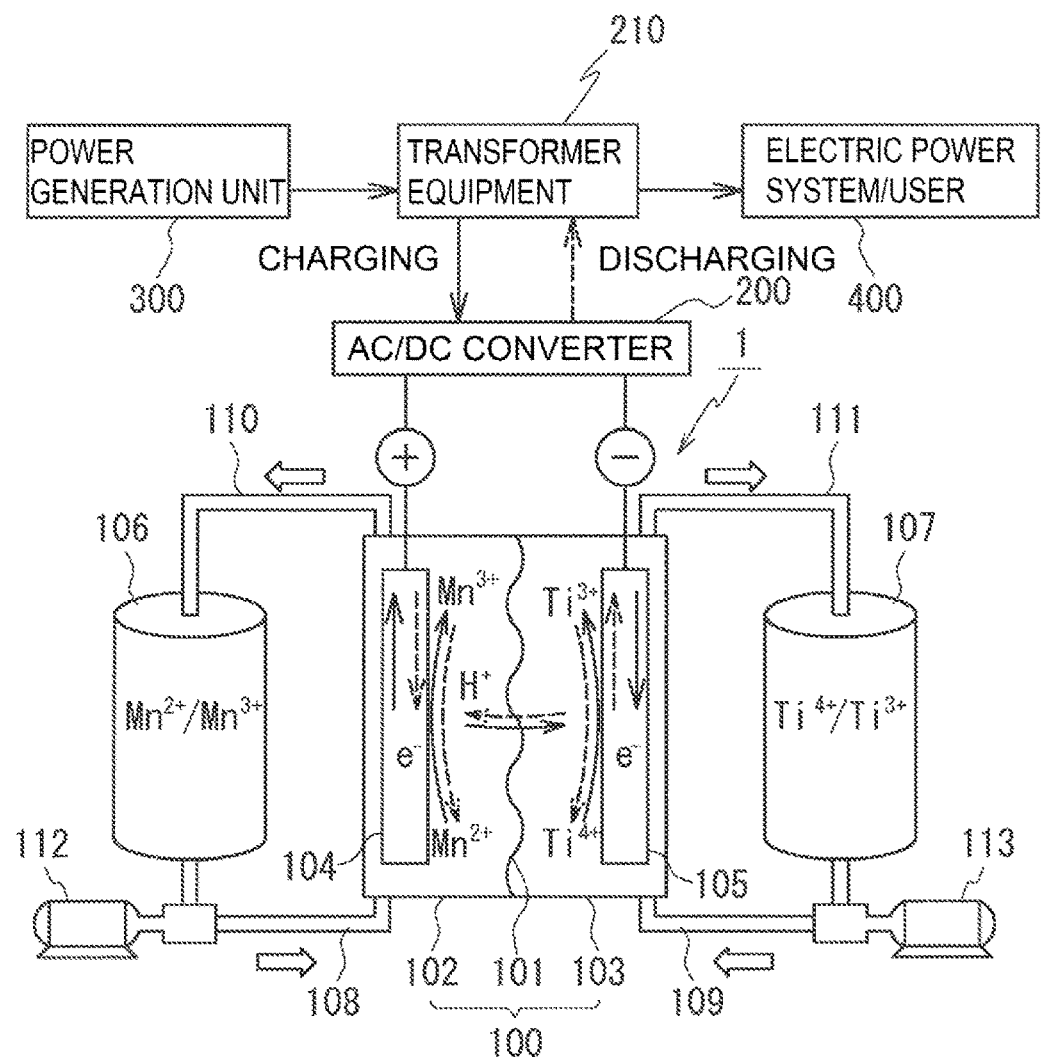

REDOX FLOW BATTERY

TECHNICAL FIELD

The present invention relates to a redox flow battery. In particular, the present invention relates to a redox flow battery that can suppress generation of a precipitation on a positive electrode.

BACKGROUND ART

Recently, as measures against global warming, electric power generation that uses natural energy (co-called renewable energy), for example, photovoltaic power generation or wind power generation, has been actively conducted globally. The output of such power generation depends significantly on natural conditions such as the weather. Therefore, when the ratio of electric power derived from natural energy to the total generated output increases, the occurrence of a problem in terms of operation of the electric power system, for example, a problem in that it becomes difficult to maintain the frequency and the voltage, is expected. One measure against this problem is to install a storage battery having a large capacity so as to achieve smoothing of an output fluctuation, accumulation of surplus power, load leveling, and the like.

An example of such a storage battery having a large capacity is a redox flow battery (hereinafter, also referred to as "RF battery"). A redox flow battery is a secondary battery that performs charging and discharging by supplying a positive electrode electrolyte and a negative electrode electrolyte to a battery cell that includes a positive electrode, a negative electrode, and a separating membrane interposed between the two electrodes. Redox flow battery electrolytes used in such a redox flow battery usually utilize, as active materials, metal ions whose valences change as a result of oxidation-reduction. Examples of the redox flow battery include an iron ($Fe^{2+}/Fe^{3+}$)-chromium ($Cr^{3+}/Cr^{2+}$)-based redox flow battery that uses an iron (Fe) ion as a positive electrode active material and uses a chromium (Cr) ion as a negative electrode active material and a vanadium ($V^{2+}/V^{3-}$—$V^{4+}/V^{5+}$)-based redox flow battery that uses V ions as active materials of two poles.

CITATION LIST

Patent Literature

PTL 1: Japanese Patent No. 4835792

SUMMARY OF INVENTION

Technical Problem

With the expansion of the use of RF batteries in the future, it is desirable to develop an RF battery having a higher energy density. In particular, it is desirable to develop a novel RF battery that can stably supply metal ions used as active materials, and preferably that can stably supply metal ions used as active materials at a low cost.

In order to address such a problem, a manganese-based redox flow battery that uses a manganese (Mn) ion as a positive electrode active material has been developed. However, in such a manganese-based redox flow battery, generation of a precipitation may occur on the positive electrode. A typical example of the precipitation is an oxide of a Mn ion. With the generation of the precipitation, the concentration of the Mn ion that takes part in a reaction decreases, thereby decreasing the energy density.

PTL 1 proposes a manganese-based redox flow battery in which a titanium (Ti) ion is contained in a positive electrode electrolyte. With this structure, a precipitation generated on a positive electrode in a battery reaction can be suppressed, and a reaction of $Mn^{2+}/Mn^{3+}$ is stably performed. It is also proposed that generation of a precipitation can be suppressed by controlling an operating condition of this redox flow battery so that a state of charge (SOC) of the positive electrode electrolyte is 90% or less. However, even in these technologies, generation of a precipitation on a positive electrode occurs in some cases. In particular, in the case where an RF battery is allowed to be in a stand-by state while the RF battery still has a high state-of-charge, generation of a precipitation may occur with time.

Accordingly, an object of the present invention is to provide a redox flow battery that can suppress generation of a precipitation on a positive electrode.

Solution to Problem

A redox flow battery according to an embodiment of the present invention is a redox flow battery that performs charging and discharging by supplying a positive electrode electrolyte and a negative electrode electrolyte to a battery cell that includes a positive electrode, a negative electrode, and a separating membrane interposed between the two electrodes, in which the positive electrode electrolyte contains a manganese ion and an additional metal ion, the negative electrode electrolyte contains at least one metal ion selected from a titanium ion, a vanadium ion, a chromium ion, and a zinc ion, and the additional metal ion contained in the positive electrode electrolyte is at least one of an aluminum ion, a cadmium ion, an indium ion, a tin ion, an antimony ion, an iridium ion, a gold ion, a lead ion, a bismuth ion, and a magnesium ion.

Advantageous Effects of Invention

The redox flow battery of the present invention can suppress generation of a precipitation on a positive electrode.

BRIEF DESCRIPTION OF DRAWINGS

FIG. 1 is a view illustrating an operating principle of a battery system including a redox flow battery of an embodiment.

DESCRIPTION OF EMBODIMENTS

Description of Embodiments of the Present Invention

First, the content of embodiments of the present invention will be listed and described.

(A) A redox flow battery according to an embodiment performs charging and discharging by supplying a positive electrode electrolyte and a negative electrode electrolyte to a battery cell that includes a positive electrode, a negative electrode, and a separating membrane interposed between the two electrodes. The positive electrode electrolyte contains a manganese (Mn) ion and an additional metal ion. The negative electrode electrolyte contains at least one metal ion selected from a titanium (Ti) ion, a vanadium (V) ion, a chromium (Cr) ion, and a zinc (Zn) ion. The additional metal ion contained in the positive electrode electrolyte is at least one of an aluminum (Al) ion, a cadmium (Cd) ion, an indium (In) ion, a tin (Sn) ion, an antimony (Sb) ion, an iridium (Ir) ion, a gold (Au) ion, a lead (Pb) ion, a bismuth (Bi) ion, and a magnesium (Mg) ion.

Since the positive electrode electrolyte contains at least one of additional metal ions, generation of a precipitation on a positive electrode can be suppressed. The term "additional metal ion" refers to an ion that mainly has a function of suppressing generation of a precipitation in the positive electrode electrolyte and that does not actively function as an active material.

(B) In the RF battery of an embodiment, the negative electrode electrolyte further contains an additional metal ion, and the additional metal ion contained in the negative electrode electrolyte is at least one of an Al ion, a Cd ion, an In ion, a Sn ion, an Sb ion, an Ir ion, a Au ion, a Pb ion, a Bi ion, and a Mg ion.

Since the negative electrode electrolyte contains at least one of additional metal ions, the following advantages are expected. (1) The battery reactivity of a metal ion functioning as a negative electrode active material can be increased (reaction rate can be increased). (2) Some ionic species may function as an active material. (3) Generation of hydrogen due to decomposition of water can be suppressed.

(C) In the RF battery of an embodiment, the positive electrode electrolyte contains a titanium ion.

Since the positive electrode electrolyte contains a Ti ion, generation of a precipitation can be further suppressed.

(D) In the RF battery of an embodiment, a concentration of the Ti ion contained in the positive electrode electrolyte is 5 M or less.

Since the concentration of the Ti ion contained in the positive electrode electrolyte is 5 M or less, the relative concentration of the Mn ion contained in the positive electrode electrolyte does not excessively decrease and an RF battery having a high energy density may be obtained while generation of a precipitation can be more effectively suppressed. Herein, M, which represents the unit of concentration, means a volume molar concentration, that is, mol/L (mole/liter). Hereinafter, this also applies to other concentrations.

(E) In the RF battery of an embodiment, the negative electrode electrolyte contains a Mn ion.

Since the negative electrode electrolyte contains a Mn ion, the electrolytes of the two poles contain the same ion species. Accordingly, the following advantages are achieved. (1) It is possible to effectively prevent the battery capacity from decreasing due to a phenomenon in which a Mn ion moves to an opposite pole and the amount of Mn ion that should originally react at each pole relatively decreases. (2) Even when a liquid transfer (a phenomenon in which an electrolyte of one pole moves to another pole) is caused with time as a result of charging and discharging and the liquid amounts of the electrolytes of the two poles vary, the variation can be easily corrected by, for example, mixing the electrolytes of the two poles. (3) The electrolytes are good in terms of producibility.

(F) In the RF battery of an embodiment, a concentration of the Mn ion contained in the negative electrode electrolyte is 0.3 M or more and 5 M or less.

Since the concentration of the Mn ion contained in the negative electrode electrolyte is in the above range, the relative concentration of the Ti ion contained in the negative electrode electrolyte does not excessively decrease and an RF battery having a high energy density may be obtained.

(G) In the RF battery of an embodiment, at least one of a concentration of the manganese ion contained in the positive electrode electrolyte and a concentration of the metal ion contained in the negative electrode electrolyte is 0.3 M or more and 5 M or less.

Since at least one of the concentration of the Mn ion functioning as an active material in the positive electrode and the concentration of the metal ion functioning as an active material in the negative electrode is in the above range, the following advantages are achieved. (1) The RF battery sufficiently contains a metal element that performs a valence-change reaction, and can have a high energy density. (2) Even when the electrolyte is an aqueous solution of an acid, the ion can be satisfactorily dissolved and thus the electrolyte is good in terms of producibility. Herein, when the negative electrode electrolyte contains two or more types of metal ions, the concentration of the metal ion refers to a total concentration.

(H) In the RF battery of an embodiment, the negative electrode electrolyte contains a titanium ion, and at least one of a concentration of the Mn ion contained in the positive electrode electrolyte and a concentration of the Ti ion contained in the negative electrode electrolyte is 0.3 M or more and 5 M or less.

Since at least one of the concentration of the Mn ion functioning as an active material in the positive electrode and the concentration of the Ti ion functioning as an active material in the negative electrode is in the above range, an RF battery having a high energy density may be obtained.

(I) In the RF battery of an embodiment, a total concentration of the additional metal ion in the positive electrode electrolyte is 0.001 M or more and 1 M or less.

Since the total concentration of the additional metal ion in the positive electrode electrolyte is in the above range, generation of a precipitation can be effectively prevented.

(J) In the RF battery of an embodiment, the additional metal ion contained in at least one of the positive electrode electrolyte and the negative electrode electrolyte or the additional metal ion contained in the negative electrode electrolyte satisfies at least one of (1) to (10) below.

(1) The Al ion is at least one of a monovalent Al ion, a divalent Al ion, and a trivalent Al ion.

(2) The Cd ion is at least one of a monovalent Cd ion and a divalent Cd ion.

(3) The In ion is at least one of a monovalent In ion, a divalent In ion, and a trivalent In ion.

(4) The Sn ion is at least one of a divalent Sn ion and a tetravalent Sn ion.

(5) The Sb ion is at least one of a trivalent Sb ion and a pentavalent Sb ion.

(6) The Ir ion is at least one of a monovalent Ir ion, a divalent Ir ion, a trivalent Ir ion, a tetravalent Ir ion, a pentavalent Ir ion, and a hexavalent Ir ion.

(7) The Au ion is at least one of a monovalent Au ion, a divalent Au ion, a trivalent Au ion, a tetravalent Au ion, and a pentavalent Au ion.

(8) The Pb ion is at least one of a divalent Pb ion and a tetravalent Pb ion.

(9) The Bi ion is at least one of a trivalent Bi ion and a pentavalent Bi ion.

(10) The Mg ion is at least one of a monovalent Mg ion and a divalent Mg ion.

Since the electric charge of each of the additional metal ions takes the above valence, it is expected that generation of a precipitation can be more effectively suppressed on the positive electrode and the effect of improving battery reactivity or the like is more easily exhibited on the negative electrode.

(K) In the RF battery of an embodiment, the Mn ion is at least one of a divalent Mn ion and a trivalent Mn ion, at least one of the positive electrode electrolyte and the negative electrode electrolyte contains a Ti ion, and the Ti ion is at least one of a trivalent Ti ion and a tetravalent Ti ion.

Since the Mn ion in the positive electrode electrolyte takes the above valence, the standard oxidation-reduction potential can be increased, and an RF battery having a high electromotive force may be obtained. Since the positive electrode electrolyte contains a Ti ion having any of the above valences, generation of a precipitation can be suppressed, and furthermore, the compositions of the electrolytes of the two poles can be a common composition and thus the electrolytes are good in terms of productivity.

The negative electrode electrolyte may contain a Ti ion as an active material. In this case, since the Ti ion takes the above valence, the Ti ion contained can be efficiently used in a battery reaction, and an RF battery having a high energy density may be obtained. Since the negative electrode electrolyte contains a Mn ion having any of the above valences, the compositions of the electrolytes of the two poles can be a common composition and thus the electrolytes are good in terms of productivity.

Details of Embodiments of the Present Invention

RF electrolytes according to embodiments of the present invention will be described below with reference to the drawing. The present invention is not limited to these embodiments, and the scope of the present invention is defined by the claims described below. It is intended that the scope of the present invention includes equivalents of the claims and all modifications within the scope of the claims.

An RF battery according to an embodiment will be described with reference to FIG. 1. An RF battery 1 of the present embodiment is a one-liquid Ti/Mn-based RF battery that uses a Mn ion as a positive electrode active material, uses a Ti ion as a negative electrode active material, and uses the same electrolyte as a positive electrode electrolyte and a negative electrode electrolyte. In FIG. 1, solid-line arrows show charging and broken-line arrows show discharging. Regarding metal ions shown in tanks 106 and 107 for two electrolytes, only Mn ions serving as a positive electrode active material and Ti ions serving as a negative electrode active material are shown in the FIGURE. Note that only typical forms of the valences of the Mn ion and the Ti ion are shown, and the metal ions can take valences other than the valences shown in the FIGURE. Active materials other than the ions of the above two elements may be contained.

<Overall Structure of RF Battery>

The RF battery 1 according to the present embodiment is typically connected between a power generation unit 300 (for example, a photovoltaic power generation plant, a wind power generation plant, or another typical power plant) and a load (in this embodiment, electric power system/user 400) through an AC/DC converter 200 and transformer equipment 210. The RF battery 1 charges and accumulates an electric power generated in the power generation unit 300, or discharges and supplies the accumulated electric power to the electric power system/user 400. Similarly to existing RF batteries, the RF battery 1 includes a battery cell 100 and a circulation mechanism (including tanks, conducting pipes, and pumps) that supplies electrolytes to the battery cell 100.

(Battery Cell and Circulation Mechanism)

The battery cell 100 in the RF battery 1 includes a positive electrode cell 102 including a positive electrode 104 therein, a negative electrode cell 103 including a negative electrode 105 therein, and a separating membrane 101 which separates the two cells 102 and 103 and through which ions permeate. A positive electrode electrolyte tank 106 that stores a positive electrode electrolyte is connected to the positive electrode cell 102 through conducting pipes 108 and 110. A negative electrode electrolyte tank 107 that stores a negative electrode electrolyte is connected to the negative electrode cell 103 through conducting pipes 109 and 111. Pumps 112 and 113 that circulate the electrolytes of the two poles are respectively connected to the conducting pipes 108 and 109. The battery cell 100 respectively supplies and circulates the positive electrode electrolyte in the positive electrode electrolyte tank 106 and the negative electrode electrolyte in the negative electrode electrolyte tank 107 to the positive electrode cell 102 (positive electrode 104) and the negative electrode cell 103 (negative electrode 105) with the conducting pipes 108 to 111 and the pumps 112 and 113, and performs charging and discharging in accordance with a change in the valence of metal ions (in the present embodiment, a Mn ion on the positive electrode and a Ti ion on the negative electrode) functioning as active materials in the electrolytes in the two poles.

The battery cell 100 is usually used in the form of a cell stack in which a plurality of unit cells each including, as components, the positive electrode 104 (positive electrode cell 102), the negative electrode 105 (negative electrode cell 103), and the separating membrane 101 are stacked. For the cell stack, a cell frame including a bipolar plate (not shown) and a frame (not shown) formed on the outer periphery of the bipolar plate is used. The positive electrode 104 is disposed on one surface of the bipolar plate, and the negative electrode 105 is disposed on another surface of the bipolar plate. The frame has a supply hole for supplying an electrolyte and a drain hole for discharging an electrolyte. By stacking a plurality of cell frames, the supply hole and the drain hole form a flow path of an electrolyte. This flow path is connected to the conducting pipes 108 to 111. The cell stack is formed by stacking a cell frame, a positive electrode 104, a separating membrane 101, a negative electrode 105, a cell frame, . . . , in that order. Note that a known structure may be used as a basic structure of the RF battery 1, as required.

(Electrolyte)

Electrolytes having different compositions may be used as a positive electrode electrolyte and a negative electrode electrolyte. However, two electrolytes serving as a positive electrode electrolyte and a negative electrode electrolyte used in the RF battery 1 of the present embodiment have a common composition. This electrolyte contains a plurality of metal ions. More specifically, the electrolyte is an aqueous sulfuric acid solution containing a Mn ion serving as an active material ion on the positive electrode, a Ti ion serving as an active material ion on the negative electrode, and an additional metal ion. This electrolyte will be described in detail below.

[Active Material Ion]

Active material ions are metal ions contained in an electrolyte, and take part in a battery reaction as a result of a change in the valence thereof due to transfer of an electron. Active material ions in two poles will be described below. In addition, a Ti ion in the positive electrode electrolyte and a Mn ion in the negative electrode electrolyte will be described.

(Positive Electrode)

On the positive electrode side, a Mn ion contained in the positive electrode electrolyte functions as an active material ion, and a Ti ion does not actively function as an active material. The Mn ion can take at least one valence of two, three, and four in the electrolyte. Specifically, a divalent Mn ion ($Mn^{2+}$) is present during discharging, and a trivalent Mn ion ($Mn^{3+}$) is present during charging. By repeating charging and discharging, a state where both types of the Mn ion are present is formed. Accordingly, when the positive electrode electrolyte contains the two types of Mn ion, the standard oxidation-reduction potential can be increased and an RF battery having a high electromotive force may be obtained. It is believed that tetravalent Mn is a precipitation ($MnO_2$), however, this $MnO_2$ is not a solid precipitation but is present in a stable state in which the precipitation appears to be dissolved in the electrolyte. During discharging, such $MnO_2$ is reduced (discharged) to $Mn^{2+}$ in a two-electron reaction, specifically, $MnO_2$ acts as an active material and can be used repeatedly, and thus $MnO_2$ may contribute to an increase in the battery capacity. Accordingly, in each of the embodiments, the presence of a slight amount of tetravalent Mn (about 10% or less relative to a total amount (mol) of Mn ion) is allowed.

As in the present embodiment, the positive electrode electrolyte may contain a Ti ion. This is because generation of a precipitation can be further suppressed. In such a case, the concentration of the Ti ion is preferably 5 M or less. The concentration of the Ti ion in the positive electrode electrolyte may be 0.3 M or more, 0.5 M or more, and furthermore, 1 M or more. However, considering the solubility in a solvent, a concentration of the Ti ion of 5 M or less, and furthermore, 2 M or less in the positive electrode electrolyte is easily used. This is because, while the effect of suppressing a precipitation is easily exhibited, the relative concentration of the Mn ion contained in the positive electrode electrolyte does not excessively decrease and an RF battery having a high energy density may be obtained. As described below, in the case where the negative electrode electrolyte contains a Ti ion as an active material ion, the concentration of the Ti ion contained in the positive electrode electrolyte may be the same as the concentration of the Ti ion contained in the negative electrode electrolyte. In this case, the compositions of the electrolytes of the two poles can be a common composition, and thus the electrolytes are good in terms of productivity.

(Negative Electrode)

In the present embodiment, in the negative electrode, a Ti ion contained in the negative electrode electrolyte functions as an active material ion, and a Mn ion does not actively function as an active material. In the negative electrode electrolyte, tetravalent Ti ions (such as $Ti^{4+}$ and $TiO^{2+}$) are present during discharging, and a trivalent Ti ion ($Ti^{3+}$) is present during charging. By repeating charging and discharging, a state where both types of the Ti ion are present is formed.

As the active material ions of the negative electrode, not only the Ti ion but also at least one of a V ion, a Cr ion, and a Zn ion may be used. In the case where a V ion is used, at least one V ion selected from a divalent V ion and a trivalent V ion is contained. In the case where a Cr ion is used, at least one Cr ion selected from a divalent Cr ion and a trivalent Cr ion is contained. In the case where a Zn ion is used, a divalent Zn ion is contained.

When any type of the V ion is contained, during discharging, a trivalent V ion ($V^{3+}$) is present, and during charging, a divalent V ion ($V^{2+}$) is present. By repeating charging and discharging, a state where both types of the V ion are present is formed. When any type of the Cr ion is contained, during discharging, a trivalent Cr ion ($Cr^{3+}$) is present, and during charging, a divalent Cr ion ($Cr^{2+}$) is present. By repeating charging and discharging, a state where both types of the Cr ion are present is formed. When a divalent Zn ion is contained, during discharging, a divalent Zn ion ($Zn^{2+}$) is present, and during charging, metallic zinc (Zn) is present. By repeating charging and discharging, a state where the divalent Zn ion is present is formed.

As the active material ions of the negative electrode, the above metal ions serving as active material ions of the negative electrode may be used alone or in combination of two or more types of metal ions. In the case where two or more types of active material ions are contained, the metal ions are preferably combined in consideration of the standard oxidation-reduction potential of each of the metal ions so that the active material ions sequentially perform a battery reaction one by one with an increase in the voltage during charging. For example, a preferable embodiment is an embodiment in which $Ti^{3+}/Ti^{4+}$, $V^{2+}/V^{3+}$, and $Cr^{2-}/Cr^{3+}$ are contained in combination in descending order of noble potential.

As in the present embodiment, the negative electrode electrolyte may contain a Mn ion. In this case, the concentration of the Mn ion is preferably 0.3 M or more and 5 M or less. This is because, as in the positive electrode electrolyte, the relative concentration of the Ti ion contained in the negative electrode electrolyte does not excessively decrease and an RF battery having a high energy density may be obtained. The concentration of the Mn ion contained in the negative electrode electrolyte may be the same as the concentration of the Mn ion contained in the positive electrode electrolyte. In this case, the compositions of the electrolytes of the two poles can be a common composition, and thus the electrolytes are good in terms of productivity.

(Others)

The concentrations of active material ions contained in the electrolytes of the two poles are each preferably 0.3 M or more and 5 M or less. This is because when the concentration of the active material ion is less than 0.3 M, it is difficult to ensure a sufficient energy density (for example, about 10 $kWh/m^3$) as a storage battery having a large capacity. Accordingly, the concentration of the active material ion is preferably high, more preferably 0.5 M or more, and still more preferably 1.0 M or more. On the other hand, in the case where an aqueous solution of an acid is used as a solvent of an electrolyte as in the present embodiment, an increase in the acid concentration may cause a decrease in solubility of an active material ion. Accordingly, the upper limit of the total concentration of active material ions in one pole is preferably 5 M or less.

In the present embodiment, among the above metal ions contained in the negative electrode electrolyte, the Ti ion preferably has a high proportion. This is because an RF battery capable of achieving a high electromotive force may be obtained. In this case, for the same reason as described above, at least one of the concentration of the Mn ion functioning as an active material on the positive electrode and the concentration of the Ti ion functioning as an active material on the negative electrode is preferably 0.3 M or more and 5 M or less.

[Additional Metal Ion]

The term "additional metal ion" refers to an ion that mainly has a function of suppressing generation of a precipitation in the positive electrode electrolyte and that does not actively function as an active material. When the negative electrode electrolyte contains an additional metal ion, at least one of the following advantages can be expected. (1) The battery reactivity of a metal ion functioning as a negative electrode active material can be increased (reaction rate can be increased). (2) Some ionic species may function as an active material. (3) Generation of hydrogen due to decomposition of water can be suppressed.

Such an additional metal ion is at least one selected from an Al ion, a Cd ion, an In ion, a Sn ion, an Sb ion, an Ir ion, a Au ion, a Pb ion, a Bi ion, and a Mg ion. These metal ions can be present in an electrolyte in the form of, for example, metal ions having valences described below.

(1) Al ion: at least one of a monovalent Al ion, a divalent Al ion, and a trivalent Al ion
(2) Cd ion: at least one of a monovalent Cd ion and a divalent Cd ion
(3) In ion: at least one of a monovalent In ion, a divalent In ion, and a trivalent In ion
(4) Sn ion: at least one of a divalent Sn ion and a tetravalent a Sn ion
(5) Sb ion: at least one of a trivalent Sb ion and a pentavalent Sb ion
(6) Ir ion: at least one of a monovalent Ir ion, a divalent Ir ion, a trivalent Ir ion, a tetravalent Ir ion, a pentavalent Ir ion, and a hexavalent Ir ion
(7) Au ion: at least one of a monovalent Au ion, a divalent Au ion, a trivalent Au ion, a tetravalent Au ion, and a pentavalent Au ion
(8) Pb ion: at least one of a divalent Pb ion and a tetravalent Pb ion
(9) Bi ion: at least one of a trivalent Bi ion and a pentavalent Bi ion
(10) Mg ion: at least one of a monovalent Mg ion and a divalent Mg ion Herein, a case where the additional metal ion is present as a metal (solid) in an electrolyte (a case where the additional metal ion is zero-valent) and a case where the additional metal ion takes a valence other than the above valences are allowed. Furthermore, ions that are formed of the same element and have different valences may be contained.

Besides the metal ions exemplified above, examples of the additional metal ion further include a lithium (Li) ion, a beryllium (Be) ion, a sodium (Na) ion, a potassium (K) ion, a calcium (Ca) ion, a scandium (Sc) ion, a nickel (Ni) ion, a zinc (Zn) ion, a gallium (Ga) ion, a germanium (Ge) ion, a rubidium (Rb) ion, a strontium (Sr) ion, an yttrium (Y) ion, a zirconium (Zr) ion, a niobium (Nb) ion, a technetium (Tc) ion, a rhodium (Rh) ion, a cesium (Cs) ion, a barium (Ba) ion, ions of lanthanoid elements (excluding cerium), a hafnium (Hf) ion, a tantalum (Ta) ion, a rhenium (Re) ion, an osmium (Os) ion, a platinum (Pt) ion, a thallium (Tl) ion, a polonium (Po) ion, a francium (Fr) ion, a radium (Ra) ion, an actinium (Ac) ion, a thorium (Th) ion, a protactinium (Pa) ion, and a uranium (U) ion.

As described above, the positive electrode electrolyte contains at least one of the additional metal ions, thereby suppressing generation of a precipitation. In addition, it is expected that when the negative electrode electrolyte contains at least one of the additional metal ions, the above advantages are achieved. In particular, when the total concentration of the additional metal ions in each pole is 0.001 M or more, these advantages are easily achieved. This concentration is preferably 0.005 M or more, more preferably 0.01 M or more, and still more preferably 0.1 M or more. On the other hand, when the total concentration of the additional metal ions in each pole exceeds 1 M, the ratio of the active material ion in the electrolyte decreases and the energy density decreases. Accordingly, in order to prevent the energy density from decreasing, the total concentration of the additional metal ions in each pole is preferably 1 M or less, more preferably 0.8 M or less, and still more preferably 0.5 M or less. In order to incorporate any of these additional metal ions in an electrolyte, a compound (typically, an oxide or a sulfuric acid compound) containing the additional metal ion is dissolved in the electrolyte.

Regarding some ion species, an additional metal ion may function as an active material. For example, a Pb ion contained in the positive electrode electrolyte and a Sn ion contained in the negative electrode electrolyte can function as active materials. In addition, a Zn ion contained in the negative electrode electrolyte mainly functions as an active material, but is expected to also function as an additional metal ion.

In the present embodiment, the type and concentration of metal ions contained in the positive electrode electrolyte are the same as the type and concentration of metal ions contained in the negative electrode electrolyte, respectively. Accordingly, the following advantages are achieved. (1) It is possible to suppress a phenomenon in which metal ions of respective poles reciprocally move to the opposite pole as a result of a liquid transfer, thereby decreasing the amount of metal ion that should originally react as an active material at each pole, decreasing the battery capacity, and decreasing the energy density. (2) Even when the liquid amounts become unbalanced as a result of a liquid transfer, the liquid amounts can be easily corrected. (3) The electrolytes are good in terms of producibility. From the above viewpoint, in the present embodiment, the electrolytes of the two poles have a common composition. Accordingly, in the case where the negative electrode electrolyte contains an active material ion other than the Ti ion, the positive electrode electrolyte may contain the active material ion of the negative electrode.

[Solvent]

In the present embodiment, water-soluble ions can be suitably used as metal ions contained in the electrolytes. In such a case, an aqueous solution can be suitably used as a solvent of the positive electrode electrolyte and the negative electrode electrolyte. In particular, when the solvent is an aqueous acid solution containing sulfuric acid or a sulfate, a plurality of the following advantages can be expected. (1) An improvement in stability of metal ions, an improvement in reactivity of active material ions, and an improvement in solubility may be obtained. (2) Even in the case where a metal ion having a high potential, such as a Mn ion, is used, a side reaction does not easily occur (decomposition does not easily occur). (3) The ionic conductivity is high and the internal resistance of the battery becomes small. (4) Unlike the case where hydrochloric acid is used, chlorine gas does not generate. (5) The electrolytes are easily prepared using a sulfate or the like and water and thus the electrolytes are good in terms of producibility. In the electrolyte containing, as a solvent, an aqueous solution of an acid, for example, a sulfuric acid anion ($SO_4^{2-}$) is present. In the case where the solvent of an electrolyte is an acid solution, an increase in the concentration of an acid can suppress generation of a precipitation to some extent. On the other hand, a decrease in solubility of a metal ion such as a Mn ion and an increase in viscosity of the electrolyte may be caused. Accordingly, it is believed that the concentration of an acid in the electrolyte in each pole is preferably less than 5 M. In particular, a concentration of an acid of 4.5 M or less, and furthermore, a concentration of an acid of 1 M or more and 4 M or less is easily used. An aqueous solution containing a known acid or a known salt, besides sulfuric acid or a sulfate, may be used as the solvent.

(Electrode)

An example of the material of the positive electrode 104 and the negative electrode 105 is a nonwoven fabric (carbon felt) formed of a carbon fiber. The use of an electrode formed of a carbon felt provides the following advantages. (1) In the case where an aqueous solution is used as an electrolyte, even when the potential reaches an oxygen-generating potential during charging, oxygen gas is not easily generated. (2) The surface area is large. (3) A circulation property of an electrolyte is good. Alternatively, other known electrodes may be used.

(Separating Membrane)

Examples of the separating membrane 101 include ion-exchange membranes such as a cation-exchange membrane and an anion-exchange membrane. Ion-exchange membranes advantageously have (1) a good isolation property between a metal ion of the positive electrode active material and a metal ion of the negative electrode active material and (2) good permeability of a $H^+$ ion (electric charge carrier in the battery), and can be suitably used as the separating membrane 101. Known other separating membranes may also be used.

(Tank and Conducting Pipe)

The positive electrode electrolyte tank 106, the negative electrode electrolyte tank 107, and the conducting pipes 108 to 111 are components that contact the RF electrolytes. Examples of the material of the components (106 to 111 include an ethylene homopolymer having a density (ASTM D 1505) in the range of 0.080 g/cm$^3$ or more and 0.960 g/cm$^3$ or less and a melt flow rate (ASTM D 1238, measuring conditions: 190° C., load 2.16 kg) of 0.01 g/10 min or more and 20 g/10 min or less and ethylene-α-olefin copolymers having a density and a melt flow rate in the above ranges.

According to the RF battery of the embodiment described above, even in the case where the state of charge is high, generation of a precipitation on the positive electrode can be suppressed. As a result, since the energy density becomes high, it is not necessary to use an electrolyte in a large amount. Thus, the size of equipment such as a tank for an electrolyte can be reduced, and the space where such equipment is installed can be reduced.

An RF battery according to the present embodiment will now be specifically described using Test Examples.

Test Example 1

[Observation of Change with Time]

In Test Example 1, on the assumption of an RF battery provided for practical use, whether or not a precipitation was generated in a positive electrode electrolyte was observed. First, RF batteries each having the same structure as the above embodiment were experimentally produced. In each of the RF batteries, a carbon felt having an electrode area of 9 cm$^2$ was used as each of two electrodes, and a cation-exchange membrane was used as a separating membrane (these components were also used in Test Examples described below, unless otherwise described). An electrolyte (sample) having the same (common) composition was used as a positive electrode electrolyte and a negative electrode electrolyte. First, an aqueous solution was prepared as Sample 1 using manganese sulfate, titanium sulfate, and sulfuric acid. Sample 1 had a manganese ion concentration of 1.0 M, a titanium ion concentration of 1.0 M, and a sulfate ion concentration (total concentration) of 5.0 M. Furthermore, Samples 2 and 3 were prepared using Sample 1 and bismuth sulfate (III). Sample 2 had a bismuth ion concentration of 0.1 M and a sulfate ion concentration (total concentration) of 5.15 M. Sample 3 had a bismuth ion concentration of 0.02 M and a sulfate ion concentration (total concentration) of 5.03 M. Subsequently, in the RF batteries, in the cases where Samples 1 to 3 were each used as an electrolyte, generation of a precipitation with time was observed. In the RF batteries using the samples, a state of charge of the positive electrode (positive electrode SOC) was set to 90%. In the RF battery using Sample 1 as an electrolyte, the observation was performed also in the case where the state of charge was 70%. Regarding the charging of the RF batteries, the RF batteries using the samples were each charged at a charging current of 315 mA and a charging finish voltage of 2 V. The state of charge was determined by the formulae below.

State of charge (%)=(amount of charged electricity/theoretical amount of electricity of one-electron reaction)×100

Amount of charged electricity (A·h)=charging current (A)×charging time (h)

Theoretical amount of electricity of one-electron reaction (A·h)=volume of electrolyte (L)×concentration of manganese ion (mol/L)×Faraday constant: 96,485 (A·sec/mol)×1 (electron)/3,600

Subsequently, each of the RF batteries that were charged to a predetermined state of charge was allowed to stand at room temperature (25° C.) to be in a stand-by state. Whether a precipitation was generated or not was visually observed with time. The precipitation is observed as a deposit in the positive electrode electrolyte. Table I shows the observation results.

TABLE I

| Sample No. | Bismuth ion concentration (M) | Positive electrode SOC (%) | Number of days until precipitate was generated |
|---|---|---|---|
| Sample 1 | 0 | 70 | About 1 day |
|  |  | 90 | About 0.1 days (about 2.5 hours) |
| Sample 2 | 0.1 | 90 | Generation was not observed at the time when 30 days passed. |
| Sample 3 | 0.02 | 90 | About 7 days |

As shown in Table I, regarding Sample 1, in the case where the state of charge was 70%, generation of a precipitation was observed after about 1 day from standing, and, in the case where the state of charge was 90%, generation of a precipitation was observed after about 2.5 hours from standing. Regarding Sample 3, generation of a precipitation was observed after about 7 days. On the other hand, regarding Sample 2, even after 30 days passed, generation of a precipitation was not observed. These results show that, in the case where a positive electrode electrolyte contains an additional metal ion, even when a RF battery is allowed to be in a stand-by state in a high state of charge, generation of a precipitation can be suppressed, and furthermore, the energy density can be increased. The results of Samples 2 and 3 show that the content of the additional metal ion of the positive electrode electrolyte is preferably 0.02 M or more, and more preferably 0.1 M or more.

Test Example 2

[Electrochemical Measurement]

In Test Example 2, oxidation-reduction reaction currents and oxidation-reduction reaction potentials of each pole were measured using an RF battery which had the same structure as Test Example 1 and included carbon felt electrodes each having an area of 0.785 cm$^2$ and using Samples 1 and 2. The oxidation-reduction reaction currents and the oxidation-reduction reaction potentials were measured by three-electrode cyclic voltammetry with potentiostat/galvanostat (manufactured by HOKUTO DENKO CORPORATION, HZ-5000) and a reference electrode of Ag/AgCl. In the measurement, first, an electrode to be measured was used as a working electrode, an opposite electrode was used as a counter electrode, and the reference electrode was disposed in an electrolyte on the electrode side to be measured. The measurement was performed while the electrolyte of the working electrode was in a static state and the electrolyte of the counter electrode was in a circulating state. In each of the tests, the sweep rate was set to 3 mV/s. Table II shows the measurement results. In Table II, the unit of items relating to a current is mA/0.785 cm$^2$, and the unit of items relating to a potential is V (vs Ag/AgCl).

TABLE II

| | Sample No. | Oxidation reaction current | Reduction reaction current | Difference in reaction current | Oxidation reaction potential | Reduction reaction potential | Difference in reaction potential |
|---|---|---|---|---|---|---|---|
| Positive electrode | Sample 1 | 346 | −298 | 644 | 1.339 | 1.097 | 0.242 |
| | Sample 2 | 400 | −457 | 857 | 1.377 | 1.092 | 0.285 |
| Negative Electrode | Sample 1 | 297 | −280 | 577 | −0.024 | −0.139 | 0.115 |
| | Sample 2 | 418 | −509 | 927 | −0.024 | −0.148 | 0.124 |

Unit of current: mA/0.785 cm$^2$
Unit of potential: V (vs Ag/AgCl)

As is apparent from Table II, the differences in the reaction current between the two electrodes in the case of using Sample 2 are larger than the differences in the reaction current between the two electrodes in the case of using Sample 1. Specifically, in the case where Sample 2 is used, the difference in the reaction current is larger than that in the case of using Sample 1 by about 1.3 times in the positive electrode and by about 1.6 times in the negative electrode. In contrast, regarding the differences in the reaction potential, there are no significant differences between the case where Sample 2 is used and the case where Sample 1 is used. These results show that the energy density is improved by incorporating an additional metal ion in an electrolyte.

Test Example 3

[Examination of State of Charge]

In Test Example 3, using RF batteries which had the same structure as Test Example 1, the state of charge of positive electrodes of the RF batteries in which Sample 1 and Sample 2 were used as electrolytes was determined. However, Test Example 3 differs from Test Example 1 in that the volume of the positive electrode electrolyte is 10 mL, the volume of the negative electrode electrolyte is 25 mL, and the electrode area is 9 cm$^2$. The state of charge was adjusted by using, as a standard, the methods for calculating the items described in Test Example 1. Table III shows the results.

TABLE III

| Sample No. | Charging time (min) | Positive electrode SOC (%) | Positive electrode potential (Vs Ag/AgCl) |
|---|---|---|---|
| Sample 1 | 78 | 153 | 1.519 V |
| Sample 2 | 84 | 165 | 1.608 V |

As is apparent from Table III, in the case where Sample 2 is used, both the charging time and the state of charge of the positive electrode are higher than those in the case where Sample 1 is used. It is believed that this is because, in the case where Sample 2 was used, as a result of the suppression of generation of a precipitation, the utilization ratio of the active material increased. These results show that the energy density is improved by incorporating an additional metal ion in an electrolyte.

Test Example 4

[Measurement of Discharge Capacity]

In Test Example 4, a charge-discharge cycle test was performed using an RF battery that used Sample 2 as an electrolyte. The RF battery had the same structure as Test Example 1. However, Test Example 4 differs from Test Example 1 in that the volume of the positive electrode electrolyte is 6 mL, the volume of the negative electrode electrolyte is 9 mL, and the charging current and the discharging current are 450 mA. The charge-side switching voltage (voltage at which switching was performed from charging to discharging) was 1.5 V, the discharge-side switching voltage (voltage at which switching was performed from discharging to charging) was 1.0 V, and the number of cycles was 3. Current efficiency (%), voltage efficiency (%), and discharge capacity (Ah) in each cycle were examined, and battery efficiency (%) was determined from current efficiency and voltage efficiency. These values were determined as described below.

Current efficiency (%)=(discharging time/charging time)×100

Voltage efficiency (%)=average voltage during discharging (V)/average voltage during charging (V)×100

Battery efficiency (%)=current efficiency (%)×voltage efficiency (%)×0.01

Discharge capacity (Ah)=discharging time (hour)× current (A)

With regard to these values, averages were calculated from the results of the second cycle and the results of the third cycle. Current efficiency was 98.5%, voltage efficiency was 87.6%, battery efficiency was 86.2%, and discharge capacity was 25.2 minutes. In this Test Example, since the current is constant, discharge capacity is represented in units of time. Theoretical discharge capacity (theoretical discharging time) of a one-electron reaction of a Mn ion ($Mn^{3+}+e^-\rightarrow Mn^{2+}$) is 21.4 minutes. Accordingly, discharge capacity of the RF battery of this Test Example using Sample 2 corresponds to about 118% of theoretical discharge capacity. These results show that the RF battery that uses, as an electrolyte, Sample 2 containing an additional metal ion has a high energy density.

Test Example 5

[Observation of Change with Time]

In Test Example 5, on the assumption of an RF battery provided for practical use, whether or not a precipitation was generated in a positive electrode electrolyte was observed. First, RF batteries each having the same structure as the above embodiment were experimentally produced.

As positive electrode electrolytes, an Al-added sample, a Mg-added sample, a Sn-added sample, and a metal-non-added sample were prepared as described below.

As the Al-added sample, an electrolyte (aqueous solution in this example) having a composition in which a (divalent) manganese ion concentration was 1.0 M, a (tetravalent) titanium ion concentration was 1.0 M, a sulfate ion concentration (total concentration) was 5.0 M, and a (trivalent) Al ion concentration was 0.1 M was prepared using manganese sulfate, titanium sulfate, sulfuric acid, and aluminum sulfate.

As the Mg-added sample, an electrolyte (aqueous solution in this example) having a composition in which a (divalent) manganese ion concentration was 1.0 M, a (tetravalent) titanium ion concentration was 1.0 M, a sulfate ion concentration (total concentration) was 5.0 M, and a (divalent) Mg ion concentration was 0.1 M was prepared using manganese sulfate, titanium sulfate, sulfuric acid, and magnesium sulfate.

As the Sn-added sample, an electrolyte (aqueous solution in this example) having a composition in which a (divalent) manganese ion concentration was 1.0 M, a (tetravalent) titanium ion concentration was 1.0 M, a sulfate ion concentration (total concentration) was 5.0 M, and a (divalent) Sn ion concentration was 0.05 M was prepared using manganese sulfate, titanium sulfate, sulfuric acid, and tin sulfate.

As the metal-non-added sample, an electrolyte (aqueous solution in this example) having a composition in which a (divalent) manganese ion concentration was 1.0 M, a (tetravalent) titanium ion concentration was 1.0 M, and a sulfate ion concentration (total concentration) was 5.0 M was prepared using manganese sulfate, titanium sulfate, and sulfuric acid.

Negative electrode electrolytes were prepared as in the positive electrode electrolytes.

A carbon felt of 9 $cm^2$ was used as an electrode of each pole of a small cell, and a cation-exchange membrane was used as a separating membrane of the cell.

Next, 7 mL of the electrolyte of each of the poles was prepared, and charging was performed using the small cell prepared as described above. The charging was performed under the condition of a constant current of 315 mA (constant current at a current density of 70 $mA/cm^2$) until the state of charge (SOC) of the manganese ion became 60% and 70% (only 70% for the Sn-added sample). Immediately after this charging, an inner wall of a tank of the positive electrode electrolyte was checked by visual observation. The state of charge (SOC, %) of the manganese ion was determined by (amount of charged electricity/theoretical amount of electricity of one-electron reaction)×100. The amount of charged electricity and the theoretical amount of electricity of one-electron reaction are represented as follows. The one-electron reaction of a manganese ion is represented by $Mn^{2+}\rightarrow Mn^{3+}+e^-$.

Amount of charged electricity (A·h)=charging current (A)×charging time (h)

Theoretical amount of electricity of one-electron reaction (A·h)=volume of electrolyte (L)×concentration of manganese ion (mol/L)×Faraday constant: 96,485 (A·sec/mol)×1 (electron)/3,600

Subsequently, the positive electrode electrolyte of each of the RF batteries that were charged to a predetermined state of charge was allowed to stand at room temperature (25° C.). Thus, the RF batteries were allowed to be in a stand-by state. Whether a precipitation was generated or not was visually observed with time. Table IV shows the observation results. The results of the Sn-added sample will be described below.

TABLE IV

| Additional metal | Amount added (M) | MnSOC (%) | Number of days until deposit was generated |
|---|---|---|---|
| Al | 0.1 | 60 | 3 to 6 |
|  |  | 70 | 1.25 |
| Mg | 0.1 | 60 | 7 |
|  |  | 70 | 1 |
| Not added | — | 60 | 3 |
|  |  | 70 | 1 |

As shown in Table IV, regarding the RF battery including the Al-added sample, generation of a precipitation was observed after 3 to 6 days from standing in the case where the state of charge was 60%, and after 1.25 days from standing in the case where the state of charge was 70%. Regarding the RF battery including the Mg-added sample, generation of a precipitation was observed after 7 days in the case where the state of charge was 60%, and after 1 day in the case where the state of charge was 70%. Furthermore, regarding the RF battery including the Sn-added sample, generation of a precipitation was observed after 1 day in the case where the state of charge was 70%. However, it was confirmed by visual observation that the precipitation was in a state of being easily dispersed. Accordingly, it is believed that the deposit was present in the form of fine particles. When the precipitation is present in the form of fine particles, re-discharging can be easily performed and thus the RF battery is easily used. In contrast, regarding the metal-non-added sample, the number of days until a precipitate was generated was 3 in the case where the state of charge was 60% and 1 in the case where the state of charge was 70%. These results showed that, in the case where an additional metal ion was contained, even when an RF battery was allowed to be in a stand-by state in a high state of charge, the effect of suppressing generation of a precipitation was equivalent to or higher than the sample to which an additional metal ion was not added (sample to which only titanium was added as a metal for suppressing generation of a precipitation).

[Supplementary Note]

In relation to the embodiments of the present invention described above, a supplementary note described below is further disclosed.

(Supplementary Note 1)

A redox flow battery that performs charging and discharging by supplying a positive electrode electrolyte and a negative electrode electrolyte to a battery cell that includes a positive electrode, a negative electrode, and a separating membrane interposed between the two electrodes, in which the positive electrode electrolyte contains a manganese ion, the negative electrode electrolyte contains at least one metal ion selected from a titanium ion, a vanadium ion, a chromium ion, and a zinc ion, and an additional metal ion, and the additional metal ion contained in the negative electrode electrolyte is at least one of an aluminum ion, a cadmium ion, an indium ion, a tin ion, an antimony ion, an iridium ion, a gold ion, a lead ion, a bismuth ion, and a magnesium ion.

According to the redox flow battery according to Supplementary note 1, since the negative electrode electrolyte contains an additional metal ion, the following advantages are expected. (1) The battery reactivity of a metal ion functioning as a negative electrode active material can be increased (reaction rate can be increased). (2) Some ionic species may function as an active material. (3) Generation of hydrogen due to decomposition of water can be suppressed. Accordingly, a redox flow battery having a high energy density may be obtained.

Besides the metal ions exemplified above, examples of the additional metal ion contained in the negative electrode electrolyte further include a lithium ion, a beryllium ion, a sodium ion, a potassium ion, a calcium ion, a scandium ion, a nickel ion, a gallium ion, a germanium ion, a rubidium ion, a strontium ion, an yttrium ion, a zirconium ion, a niobium ion, a technetium ion, a rhodium ion, a cesium ion, a barium ion, lanthanoid element ions excluding a cerium ion, a hafnium ion, a tantalum ion, a rhenium ion, an osmium ion, a platinum ion, a thallium ion, a polonium ion, a francium ion, a radium ion, an actinium ion, a thorium ion, a protactinium ion, and a uranium ion.

INDUSTRIAL APPLICABILITY

The redox flow battery of the present invention may be suitably used as a large-capacity storage battery for the purpose of stabilizing fluctuation of power generation output, accumulating surplus power when the generated output is excess, load leveling, and the like for electric power generation that uses natural energy, such as photovoltaic power generation or wind power generation. Furthermore, the redox flow battery of the present invention may be additionally installed in a common power plant, a large commercial facility, or the like and may be suitably used as a large-capacity storage battery as a measure for dealing with momentary power failure/blackout or for obtaining load leveling.

| Reference Signs List | |
|---|---|
| 1 redox flow battery (RF battery) | 100 battery cell |
| 101 separating membrane | 102 positive electrode cell |
| 103 negative electrode cell | |
| 104 positive electrode | 105 negative electrode |
| 106 positive electrode electrolyte tank | |
| 107 negative electrode electrolyte tank | 108 to 111 conducting pipe |
| 112 and 113 pump | |
| 200 AC/DC converter | 210 transformer equipment |
| 300 power generation unit | 400 electric power system/user |

The invention claimed is:

1. A redox flow battery that performs charging and discharging by supplying a positive electrode electrolyte and a negative electrode electrolyte to a battery cell that includes a positive electrode, a negative electrode, and a separating membrane interposed between the two electrodes, wherein the positive electrode electrolyte contains a manganese ion and an additional metal ion, the negative electrode electrolyte contains at least one metal ion selected from a titanium ion, a vanadium ion, a chromium ion, and a zinc ion, the additional metal ion contained in the positive electrode electrolyte is at least one of an aluminum ion, a cadmium ion, an indium ion, a tin ion, an antimony ion, an iridium ion, a gold ion, a lead ion, a bismuth ion, and a magnesium ion, and a total concentration of the additional metal ion in the positive electrode electrolyte is 0.001 M or more and 1 M or less.

2. The redox flow battery according to claim 1, wherein the negative electrode electrolyte further contains an additional metal ion, and the additional metal ion contained in the negative electrode electrolyte is at least one of an aluminum ion, a cadmium ion, an indium ion, a tin ion, an antimony ion, an iridium ion, a gold ion, a lead ion, a bismuth ion, and a magnesium ion.

3. The redox flow battery according to claim 1, wherein the positive electrode electrolyte contains a titanium ion.

4. The redox flow battery according to claim 3, wherein a concentration of the titanium ion contained in the positive electrode electrolyte is 5 M or less.

5. The redox flow battery according to claim 1, wherein the negative electrode electrolyte contains a manganese ion.

6. The redox flow battery according to claim 5, wherein a concentration of the manganese ion contained in the negative electrode electrolyte is 0.3 M or more and 5 M or less.

7. The redox flow battery according to claim 1, wherein at least one of a concentration of the manganese ion contained in the positive electrode electrolyte and a concentration of the metal ion contained in the negative electrode electrolyte is 0.3 M or more and 5 M or less.

8. The redox flow battery according to claim 1, wherein the negative electrode electrolyte contains a titanium ion, and at least one of a concentration of the manganese ion contained in the positive electrode electrolyte and a concentration of the titanium ion contained in the negative electrode electrolyte is 0.3 M or more and 5 M or less.

9. The redox flow battery according to claim 1, wherein the additional metal ion contained in at least one of the positive electrode electrolyte and the negative electrode electrolyte or the additional metal ion contained in the negative electrode electrolyte satisfies at least one of (1) to (10) below:

(1) the aluminum ion is at least one of a monovalent aluminum ion, a divalent aluminum ion, and a trivalent aluminum ion;

(2) the cadmium ion is at least one of a monovalent cadmium ion and a divalent cadmium ion;

(3) the indium ion is at least one of a monovalent indium ion, a divalent indium ion, and a trivalent indium ion;

(4) the tin ion is at least one of a divalent tin ion and a tetravalent tin ion;

(5) the antimony ion is at least one of a trivalent antimony ion and a pentavalent antimony ion;

(6) the iridium ion is at least one of a monovalent iridium ion, a divalent iridium ion, a trivalent iridium ion, a tetravalent iridium ion, a pentavalent iridium ion, and a hexavalent iridium ion;

(7) the gold ion is at least one of a monovalent gold ion, a divalent gold ion, a trivalent gold ion, a tetravalent gold ion, and a pentavalent gold ion;
(8) the lead ion is at least one of a divalent lead ion and a tetravalent lead ion;
(9) the bismuth ion is at least one of a trivalent bismuth ion and a pentavalent bismuth ion;
(10) the magnesium ion is at least one of a monovalent magnesium ion and a divalent magnesium ion.

10. The redox flow battery according to claim 1, wherein the manganese ion is at least one of a divalent manganese ion and a trivalent manganese ion, at least one of the positive electrode electrolyte and the negative electrode electrolyte contains a titanium ion, and the titanium ion is at least one of a trivalent titanium ion and a tetravalent titanium ion.

\* \* \* \* \*